(12) United States Patent
Yoshida et al.

(10) Patent No.: US 9,791,850 B2
(45) Date of Patent: Oct. 17, 2017

(54) NUMERICAL CONTROL SYSTEM

(71) Applicant: FANUC Corporation, Minamitsuru-gun, Yamanashi (JP)

(72) Inventors: Kouhei Yoshida, Minamitsuru-gun (JP); Yoshito Miyazaki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 299 days.

(21) Appl. No.: 14/736,590

(22) Filed: Jun. 11, 2015

(65) Prior Publication Data

US 2015/0362912 A1    Dec. 17, 2015

(30) Foreign Application Priority Data

Jun. 13, 2014   (JP) .................................. 2014-122796

(51) Int. Cl.
*G05B 19/408*    (2006.01)
*G06F 13/24*     (2006.01)

(52) U.S. Cl.
CPC ........... *G05B 19/408* (2013.01); *G06F 13/24* (2013.01); *G05B 2219/34359* (2013.01)

(58) Field of Classification Search
CPC ........ G05B 15/02; G05B 19/00; G05B 19/18; G05B 19/406; G05B 19/408; G05B 19/4147

See application file for complete search history.

(56) References Cited

U.S. PATENT DOCUMENTS

| | | | | |
|---|---|---|---|---|
| 4,661,899 A | * | 4/1987 | Usuda ................ | G05B 19/4147 700/180 |
| 6,778,867 B1 | * | 8/2004 | Ziegler ................ | B25J 9/1674 318/563 |
| 9,377,770 B2 | * | 6/2016 | Miyazaki ................ | G05B 19/18 |
| 2013/0245788 A1 | | 9/2013 | Miyazaki et al. | |
| 2014/0025185 A1 | | 1/2014 | Miyazaki et al. | |

(Continued)

FOREIGN PATENT DOCUMENTS

| | | | | |
|---|---|---|---|---|
| CN | 103576613 A | | 2/2014 | |
| CN | 105320072 A | * | 2/2016 | ........... G05B 19/408 |
| JP | WO 8501595 A1 | * | 4/1985 | ......... G05B 19/4147 |

(Continued)

OTHER PUBLICATIONS

The Notification of the First Office Action issued Nov. 28, 2016 in Chinese Patent Application No. 2015103293687 (5 pages) with an English Translation (8 pages).

(Continued)

*Primary Examiner* — Crystal J Barnes-Bullock
(74) *Attorney, Agent, or Firm* — Drinker Biddle & Reath LLP (57) ABSTRACT

A numerical control system exchanges input/output signals between a numerical controller and an IO unit and the IO unit includes a first control unit that changes an idle signal output from the IO unit using an input signal as a trigger to a specific waveform pattern signal and when the specific waveform pattern signal is received, transmits the specific waveform pattern signal to a former side. The numerical controller includes a second control unit that outputs an interrupt signal when the specific waveform pattern signal is received.

10 Claims, 8 Drawing Sheets

(56) References Cited

U.S. PATENT DOCUMENTS

2014/0350894 A1    11/2014  Yamashita et al.
2015/0105874 A1*    4/2015  Miyazaki .............. G05B 15/02
                                                         700/80

FOREIGN PATENT DOCUMENTS

| JP | EP 0157882 A1 * | 10/1985 | ......... G05B 19/4147 |
| JP | H05-66820 A | 3/1993 | |
| JP | H06-149320 A | 5/1994 | |
| JP | 2010-033309 A | 2/2010 | |
| JP | 2013-196307 A | 9/2013 | |
| JP | 2014021887 A * | 2/2014 | ............. G05B 19/18 |
| JP | DE 102015007522 A1 * | 12/2015 | ........... G05B 19/408 |
| WO | WO-2013/124903 A1 | 8/2013 | |

OTHER PUBLICATIONS

Decision to Grant a Patent issued Oct. 13, 2015 in Japanese Patent Application No. 2014-122796 (3 pages) with an English translation (3 pages).

\* cited by examiner

NUMERICAL CONTROL SYSTEM

RELATED APPLICATION DATA

This application claims priority under 35 U.S.C. §119 and/or §365 to Japanese Application No. 2014-122796 filed Jun. 13, 2014, the entire contents is incorporated herein by reference.

BACKGROUND OF THE INVENTION

1. Field of the Invention

The present invention relates to a numerical control system that reduces a delay time when an input signal of an external input/output unit (IO unit) is transferred to a numerical controller that controls machine tools or robots via serial communication.

2. Description of the Related Art

A configuration in which a plurality of IO units is connected between a numerical controller and machine tools or robots (hereinafter, referred to as "numerical control machine tools") to input/output DI/DO signals (input signals/output signals) is adopted. Then, the numerical controller and the IO units generally exchange DI/DO data at fixed periods. The numerical controller and the IO units exchange DI/DO data at fixed periods, but when there is no exchange of DI/DO data, a signal (idle signal) that repeats toggling in a certain period is input/output.

Figure 8:
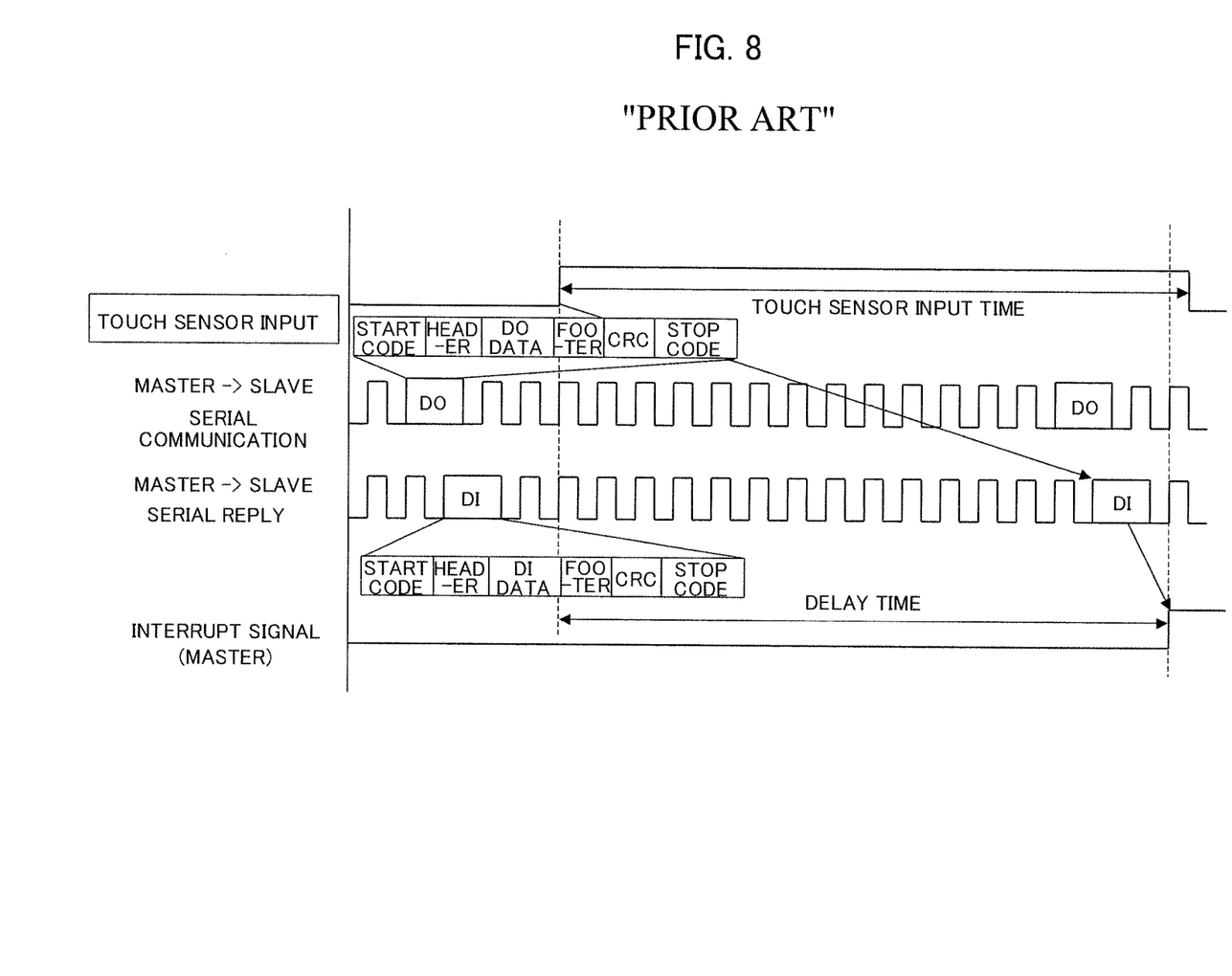
FIG. 8 is a diagram illustrating a conventional technology.

On the other hand, a specific data pattern is input/output for transmission/reception of DI/DO. Accordingly, idle signals and data patterns representing other DI/DO can be distinguished and the numerical controller determines to which category the received signal belongs (see FIG. 8). As shown in FIG. 8, DI data is transmitted as an aggregate of the start code, header, DI data, footer, CRC, and stop code. Also, DO data is transmitted as an aggregate of the start code, header, DO data, footer, CRC, and stop code.

If a delay time when an input signal into an IO unit is transferred to the numerical controller is reduced, for example, a cycle time of an in-machine measuring function can be reduced.

The in-machine measuring function of a numerical control machine tool in which a touch sensor is mounted on a shaft moving portion of a feed shaft and the touch sensor is brought into contact with an object to be measured by controlling the feed shaft to measure the outside diameter and the like of a work before and after machining by using a signal from the touch sensor during the contact is practically used. The in-machine measuring function measures the object to be measured, based on the timing, which the numerical controller knows, in which the output of the touch sensor changes from OFF to ON when the touch sensor is brought into contact with the object to be measured (work) after the feed shaft is moved.

In addition, a configuration in which a plurality of IO units is connected between the numerical controller and machine tools to input/output DI/DO signals is adopted. If the touch sensor output is input into the IO unit in a numerical control machine tool configured as described above, compared with a case when input into the interface of the DI signal provided in the numerical controller, the configuration/wiring can be designed more freely.

The above technology is disclosed by JP 2013-196307 A. The technology disclosed by JP 2013-196307 A provides a numerical control system capable of making more precise in-machine measurements by making time measurements by IO units.

As similar technologies, JP 05-66820 A discloses a method of event-driven communication being performed by an IO unit with a numerical controller by input of a DI signal as a trigger to prevent an increase of the delay time and JP 06-149320 A discloses a method of synchronizing timers, each of which is held by each IO unit, counting an internal timer by a communication protocol.

However, the numerical controller and the IO unit exchange DI/DO data only periodically and thus, according to the method of JP 2013-196307 A, the delay time between input of the touch sensor output and the detection of input of the touch sensor output into the IO unit by the numerical controller may increase. If the delay time increases, the time between an in-machine measuring operation and the next operation increases, leading to an increased cycle time.

If the technology disclosed by JP 05-66820 A or JP 06-14932 A is used, an increased delay time can be prevented, but according to the above method, an arbitration circuit for data transmission is needed and the circuit scale is increased, which is disadvantageous for IO units from which the cost reduction is strictly demanded.

SUMMARY OF THE INVENTION

In view of problems of the conventional technology, an object of the present invention is to provide a numerical control system capable of making the cycle time of in-machine measurement shorter than an exchange period of DI/DO data at fixed periods.

A numerical control system according to the present invention is a numerical control system having a numerical controller and one or a plurality of IO units connected to the numerical controller and in which input/output signals are configured to be exchanged between the numerical controller and the IO unit via serial communication. The IO unit includes a first control unit configured to change an idle signal output from the IO unit using an input signal as a trigger to a preset specific waveform pattern signal and, transmit the specific waveform pattern signal to a former side when the specific waveform pattern signal is received. The numerical controller includes a second control unit configured to output an interrupt signal when the specific waveform pattern signal is received.

When the input signal is input into the IO unit, the first control unit of the IO unit may change a period of the idle signal output from the IO unit and output the idle signal as the specific waveform pattern signal.

When the input signal is input into the IO unit, the first control unit of the IO unit may insert a specific data pattern into the idle signal output from the IO unit and output the idle signal as the specific waveform pattern signal.

When the input signal is input into the IO unit, the first control unit of the IO unit may change a phase of the idle signal output from the IO unit and output the idle signal as the specific waveform pattern signal.

When the IO unit on a latter side receives the input signal, changes the idle signal output from the IO unit to the specific waveform pattern signal, and outputs the idle signal to the IO unit on a former side, the first control unit of the IO unit may detect the specific waveform pattern signal in the changed idle signal and only when predetermined conditions are met, output the detected idle signal unchanged to the former side.

A numerical control system according to the present invention is a numerical control system having a numerical controller and one or a plurality of IO units connected to the numerical controller and in which input/output signals are configured to be exchanged between the numerical controller and the IO unit via serial communication. The IO unit includes a receiving unit configured to determine a type of an input signal input into the IO unit and a third control unit configured to preset a specific waveform pattern of an idle signal output from the IO unit for each of the types of the input signal and output a preset specific waveform pattern signal of the idle signal output from the IO unit in accordance with the type of the input signal as a trigger. The numerical controller includes a fourth control unit configured to determine the type of the input signal in accordance with the specific waveform pattern signal when the specific waveform pattern signal is received.

When the IO unit on a latter side receives the input signal, changes the idle signal output from the IO unit to the specific waveform pattern signal, and outputs the idle signal to the IO unit on a former side, the third control unit of the IO unit may detect the specific waveform pattern signal in the changed idle signal and only when predetermined conditions are met, output the detected idle signal unchanged to the former side.

By including the above configuration, the present invention can provide a numerical control system capable of making the cycle time of in-machine measurement shorter than the exchange period of DI/DO data at fixed periods.

BRIEF DESCRIPTION OF THE DRAWINGS

The above object and other objects and features of the present invention will become apparent from the description of embodiments below with reference to appended drawings. Among these diagrams.

DETAILED DESCRIPTION OF THE PREFERRED EMBODIMENTS

Figure 1:
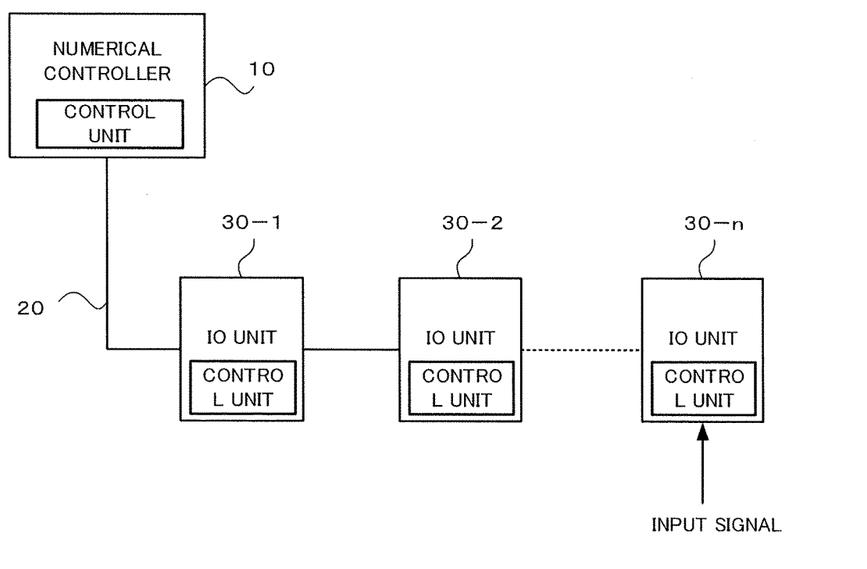
FIG. 1 is a diagram illustrating a numerical control system in which a plurality of IO units is connected to a numerical controller like a chain.

FIG. 1 is a diagram illustrating a numerical control system in which a plurality of IO units is connected to a numerical controller like a chain. The numerical controller 10 is an apparatus that controls machine tools and robots. A plurality of IO units 30 is connected to the numerical controller 10 via a signal line 20 like a chain. The IO unit 30 includes a control unit described later. A signal from an in-machine measuring apparatus (for example, a touch sensor) is input into an IO unit 30-n as an input signal. Also, the numerical controller 10 includes a control unit described later.

The IO unit 30 includes the control unit that changes an idle signal output from the IO unit to a preset specific waveform pattern signal using an input signal as a trigger and when the specific waveform pattern signal is received, transmits the specific waveform pattern signal to the former side. The control unit is described in each claim as a first control unit or a third control unit in accordance with each claim.

The numerical controller 10 includes the control unit that outputs an interrupt signal when the specific waveform pattern signal is received. The control unit is described in each claim as a second control unit or a fourth control unit in accordance with each claim.

Hereinafter, each embodiment will be described.

First Embodiment

A first embodiment "changes an idle signal to a specific signal pattern and notifies a numerical controller".

A numerical control system in the present invention changes the idle signal output from the IO unit 30 to the specific signal pattern when the IO unit detects input of the touch sensor output. The idle signal changed to the specific signal pattern is input into the numerical controller 10 and thus, the numerical controller 10 having detected the specific signal pattern can detect input of the touch sensor output into the IO unit 30 without waiting for communication of DI/DO signals. Accordingly, the numerical controller 10 can be notified that the touch sensor output has been input into the IO unit 30 without the need for arbitration for data transmission and with no delay time, and the next operation can immediately be started after the in-machine measuring operation is completed. Therefore, the cycle time is not increased. Examples of changing the specific signal pattern will be shown in second to sixth embodiments.

As described in Description of the Related Art, the numerical controller and the IO unit exchange DI/DO data at fixed periods and when DI/DO data is not exchanged, a signal (idle signal) that repeats toggling in a specific period is always input/output. With the above idle signal being input into the numerical controller, the signal can be identified as a DI/DO signal having the data configuration as shown in FIG. 8 and the numerical controller can determine to be a state in which "DI/DO signals are not exchanged".

Normally, the period or pattern of an idle signal is not changed by the IO unit 30. But the IO unit 30 used for an embodiment of the present invention includes a control unit (first control unit) capable of changing an idle signal to a specific signal pattern from the IO unit side when the IO unit detects input of the touch sensor output from a touch sensor as an in-machine measuring apparatus. The specific signal pattern is output to the numerical controller 10 via the signal line 20.

On the other hand, the numerical controller 10 includes a control unit (second control unit) that turns on an interrupt signal only when the specific signal pattern of a predetermined number of bits or more is received. When the control unit (second control unit) of the numerical controller 10 turn on an interrupt signal, the numerical controller 10 instantly ends the measuring cycle to move to the next operation cycle. In this manner, the numerical controller 10 can be notified of input of the touch sensor output without the delay time being increased.

By using the present method, while currently the touch sensor remains in contact with the object to be measured until a DI signal is received, leading to a loss of time, the feed shaft can be operated without waiting for reception of a DI signal due to an interrupt to proceed to the next step, which does not increase the cycle time due to a wait for reception of a DI signal. Though the time of input of a touch sensor cannot be known when an interrupt occurs, the input time of the touch sensor can be detected after DI is received and thus, there is no problem with the in-machine measuring functions.

In the first embodiment, the numerical controller can be notified of input of the touch sensor output by an idle signal being changed to a specific signal pattern after the input of the touch sensor output. In the second to sixth embodiments, concrete methods of changing an idle signal will be described.

Second Embodiment

A second embodiment "notifies the numerical controller after changing the period of an idle signal".

The method of notifying the numerical controller of input of the touch sensor output by changing the period of an idle signal as a method of changing the idle signal to a specific signal pattern will be described.

The IO unit 30 includes the control unit (first control unit) that changes the period of an idle signal when the IO unit 30 receives an output signal from a touch sensor. On the other hand, the numerical controller 10 includes the control unit (second control unit) that turns on an interrupt signal only when detected that the period of an idle signal has been changed. With the above configuration, the numerical controller 10 can be notified of input of the touch sensor output correctly without the delay time being increased.

Figure 2:
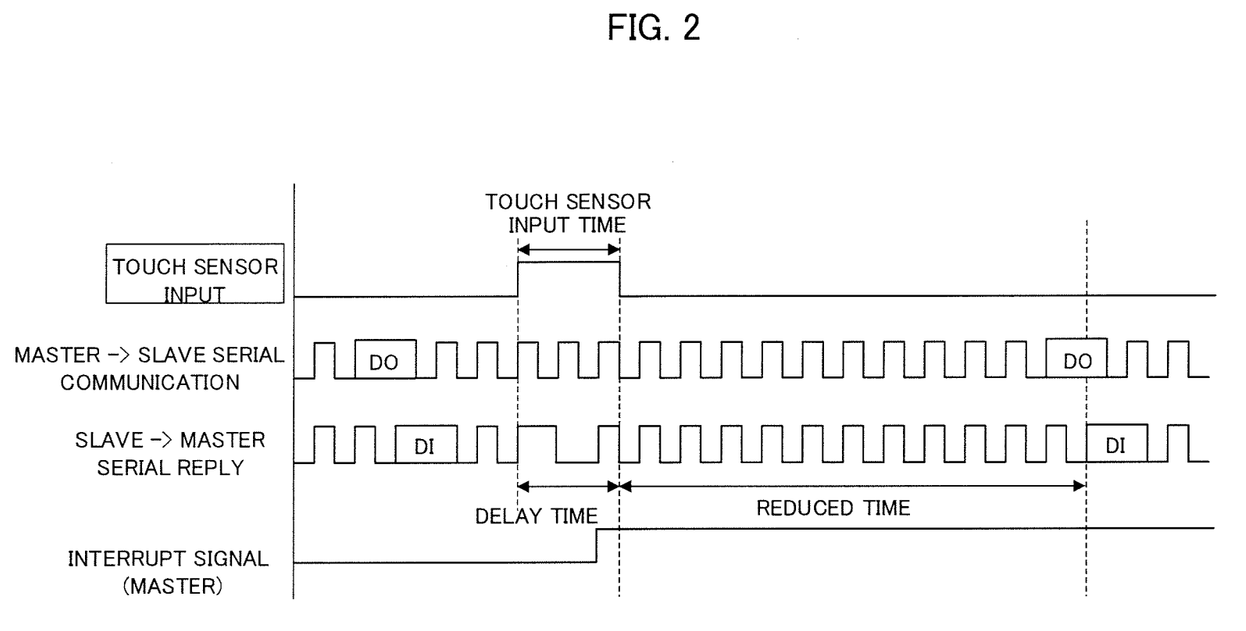
FIG. 2 is a diagram illustrating an embodiment that changes a period of an idle signal.

FIG. 2 is a diagram illustrating an embodiment that changes the period of an idle signal. When an output signal of a touch sensor is received by the IO unit 30 as a slave and the output signal is transmitted to the numerical controller 10 as a master from the IO unit 30 via the signal line 20, the numerical controller 10 receives the output signal of the touch sensor delaying by the "delay time". A touch sensor input time is a time from the time when the output signal of the touch sensor is input into the IO unit 30 until the time when the numerical controller 10 receives a signal transmitted from the IO unit 30 and notifying that the output signal of the touch sensor has been received. In the second embodiment, the "delay time" can be reduced by a "reduced time" compared with the conventional technology shown in FIG. 8. That is, the touch sensor input time can be made shorter than a transmission period of DI/DO signals.

In the second embodiment, as described above, the IO unit 30 can notify the numerical controller 10 that the touch sensor output has been input by changing the period of an idle signal.

Third Embodiment

A third embodiment "notifies the numerical controller after mixing a specific data pattern into an idle signal".

Figure 3:
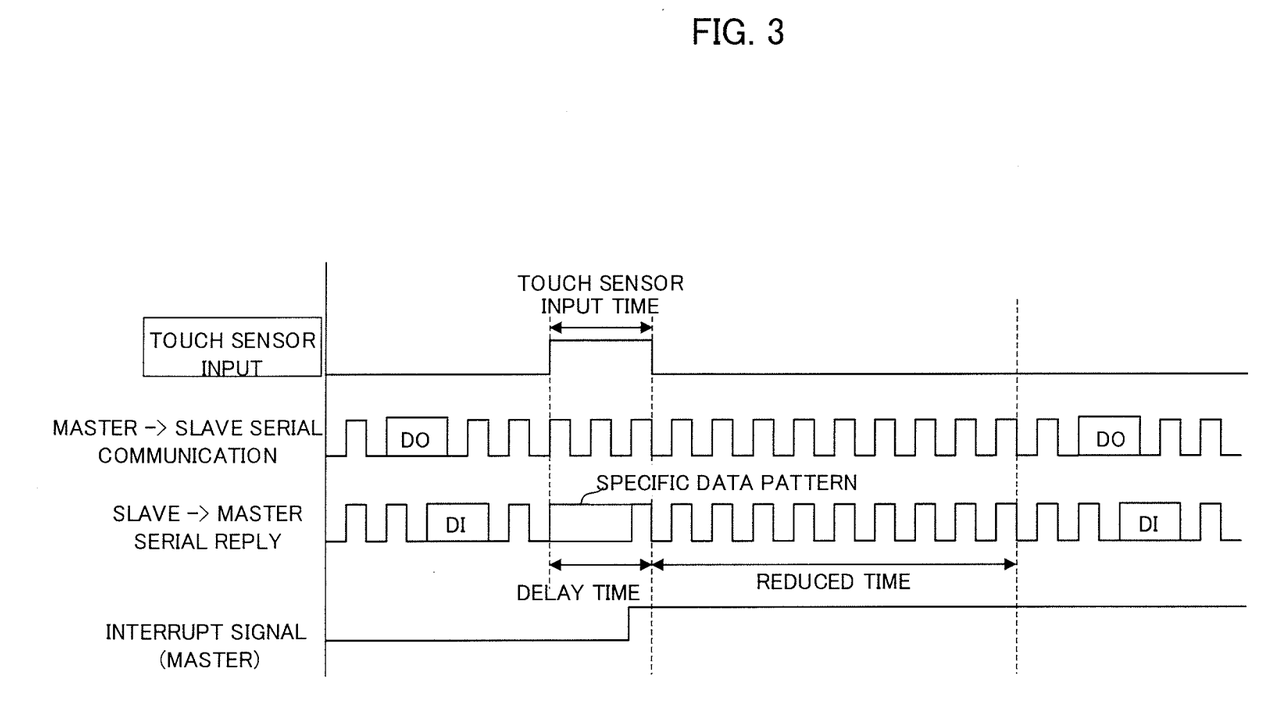
FIG. 3 is a diagram illustrating an embodiment that mixes a data pattern into the idle signal.

FIG. 3 is a diagram illustrating an embodiment that mixes a data pattern into the idle signal. The description of the touch sensor input time, delay time, and reduced time is the same as that of FIG. 2 in the second embodiment.

The third embodiment notifies the numerical controller of input of the touch sensor output by mixing a specific data pattern into an idle signal. The control unit (first control unit) that mixes a specific data pattern into an idle signal when the IO unit 30 receives an output signal from a touch sensor is incorporated into the IO unit 30. On the other hand, the numerical controller 10 has the control unit (second control unit) that turns on an interrupt signal only when the numerical controller 10 detects that the data pattern of an idle signal of a predetermined number of bits or more has been changed incorporated thereinto. With the above configuration, the numerical controller 10 can be notified that the touch sensor output has been input into the IO unit correctly without the delay time being increased.

Fourth Embodiment

A fourth embodiment "notifies the numerical controller after changing the phase of an idle signal".

Figure 4:
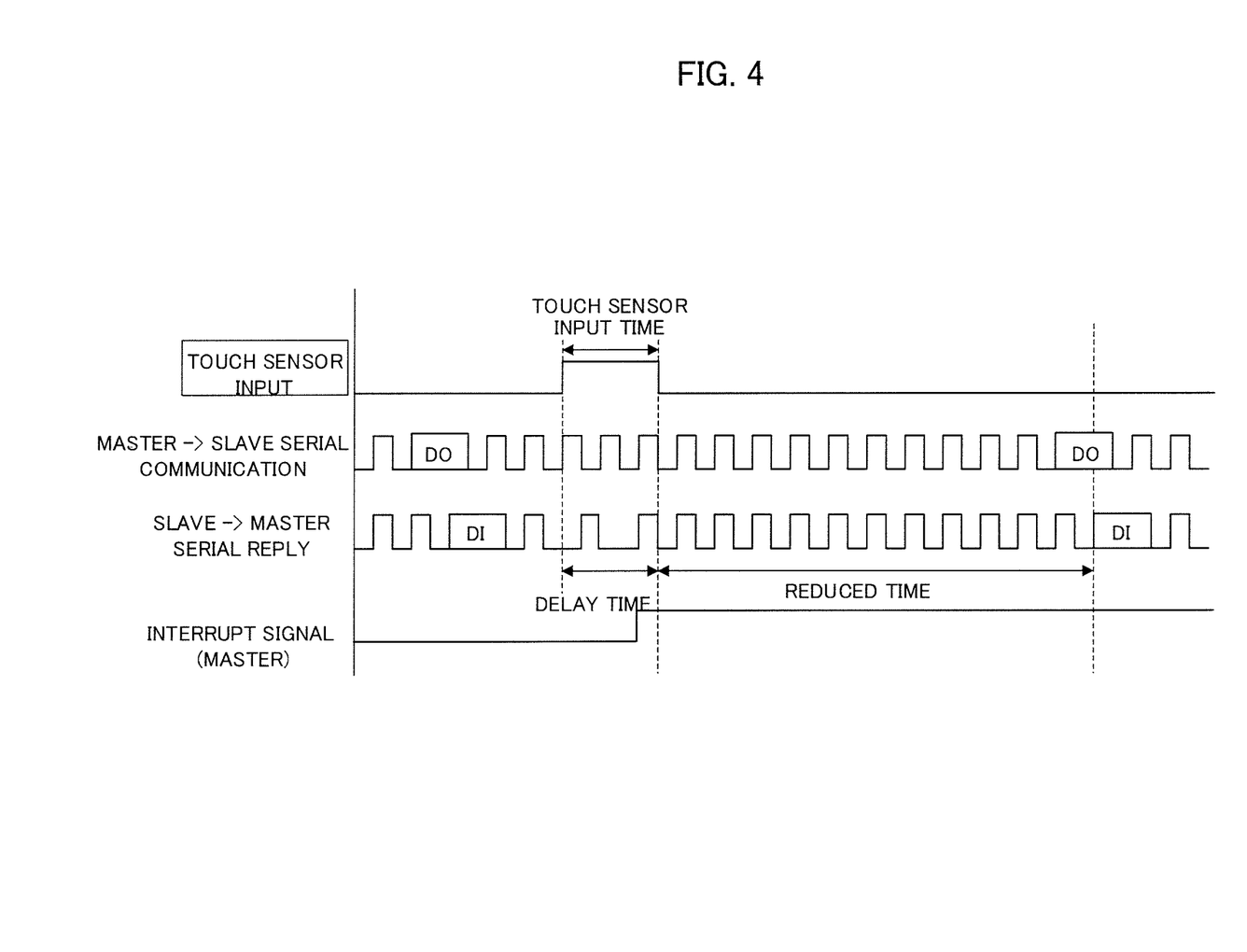
FIG. 4 is a diagram illustrating an embodiment that changes a phase of the idle signal.

FIG. 4 is a diagram illustrating an embodiment that changes a phase of the idle signal. The description of the touch sensor input time, delay time, and reduced time is the same as that of FIG. 2 in the second embodiment.

The fourth embodiment notifies the numerical controller of input of the touch sensor output by changing the phase of an idle signal. The IO unit 30 includes the control unit (first control unit) capable of changing the phase of an idle signal. On the other hand, the numerical controller 10 includes the control unit (second control unit) that turns on an interrupt signal only when detected that the phase of an idle signal has been changed. With the above configuration, the numerical controller can be notified of input of the touch sensor output correctly without the delay time being increased.

Fifth Embodiment

Figure 5:
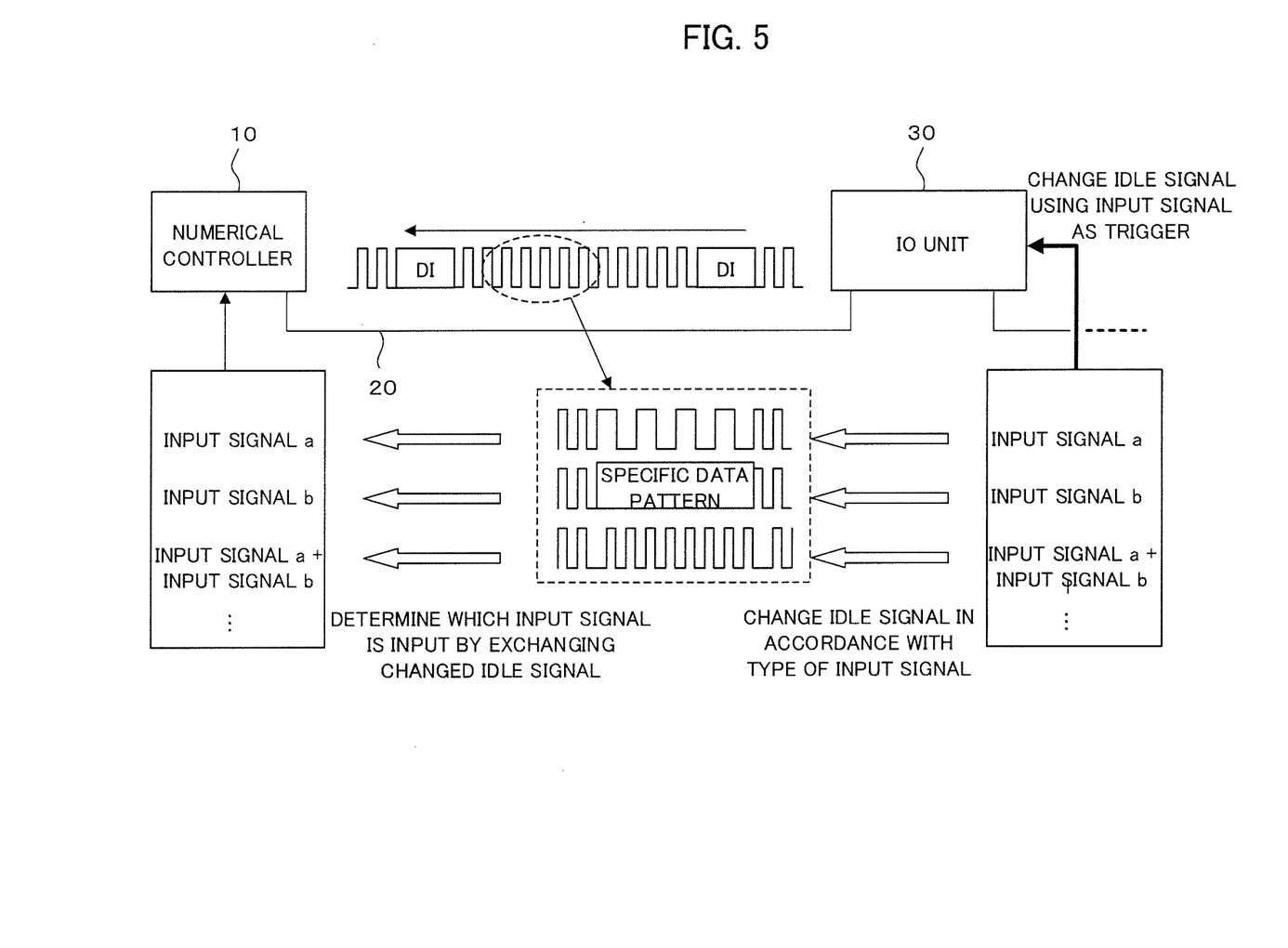
FIG. 5 is a diagram illustrating an embodiment that changes the data pattern of the idle signal in accordance with the type of an input signal.

A fifth embodiment "notifies the numerical controller of the type of an input signal after changing the data pattern of an idle signal in accordance with the type of the input signal". That is, the fifth embodiment notifies the numerical controller of the type of an input signal after changing an idle signal in accordance with the type of the input signal. FIG. 5 is a diagram illustrating an embodiment that changes the data pattern of the idle signal in accordance with the type of an input signal.

The first embodiment can notify the numerical controller that the touch sensor output has been input by changing an idle signal using an input signal as a trigger. As the input signal into the IO unit 30, not only the touch sensor output shown in the first embodiment, but also various kinds of input signal can be considered. According to the method in the first embodiment, however, if a plurality of input signals exchanged by the IO unit 30 is present, the numerical controller 10 cannot know which input signal is exchanged by the IO unit 30 until a DI signal is received from the IO unit 30.

Thus, even if a change in an idle signal is detected, the numerical controller 10 cannot know which input signal is exchanged by minimizing the delay time and a correct response to the input signal may not be returned. This problem is solved by the fifth embodiment.

In the first embodiment, when the IO unit 30 receives an input signal, the numerical controller 10 is notified of the input signal by changing an idle signal to a preset specific data pattern. In the fifth embodiment, on the other hand, the IO unit 30 includes a control unit (third control unit) that changes an idle signal to the data pattern set in accordance with the type of an input signal by setting the IO unit 30 to be able to output a different specific data pattern for each type of the input signal in advance.

With the above configuration, when some input signal is input into the IO unit 30, an idle signal is changed to the aforementioned specific data pattern in accordance with the type of the input signal and output to the numerical controller 10. Also, the numerical controller 10 includes a control unit (fourth control unit) that determines the type of an input signal when some specific data pattern is exchanged by the numerical controller 10 without waiting for a DI signal from the IO unit by setting the relationship between the aforementioned specific data pattern set by the IO unit and the type of the input signal in advance.

According to the fifth embodiment, the numerical controller 10 can recognize which input signal is input into the IO unit 30 without receiving a DI signal so that the numerical controller 10 can be notified of the type of the input signal without the delay time being increased.

Sixth Embodiment

A sixth embodiment "notifies an IO unit on the former side of an input signal in a numerical control system configured by daisy-chaining a numerical controller and a plurality of IO units".

Figure 6:
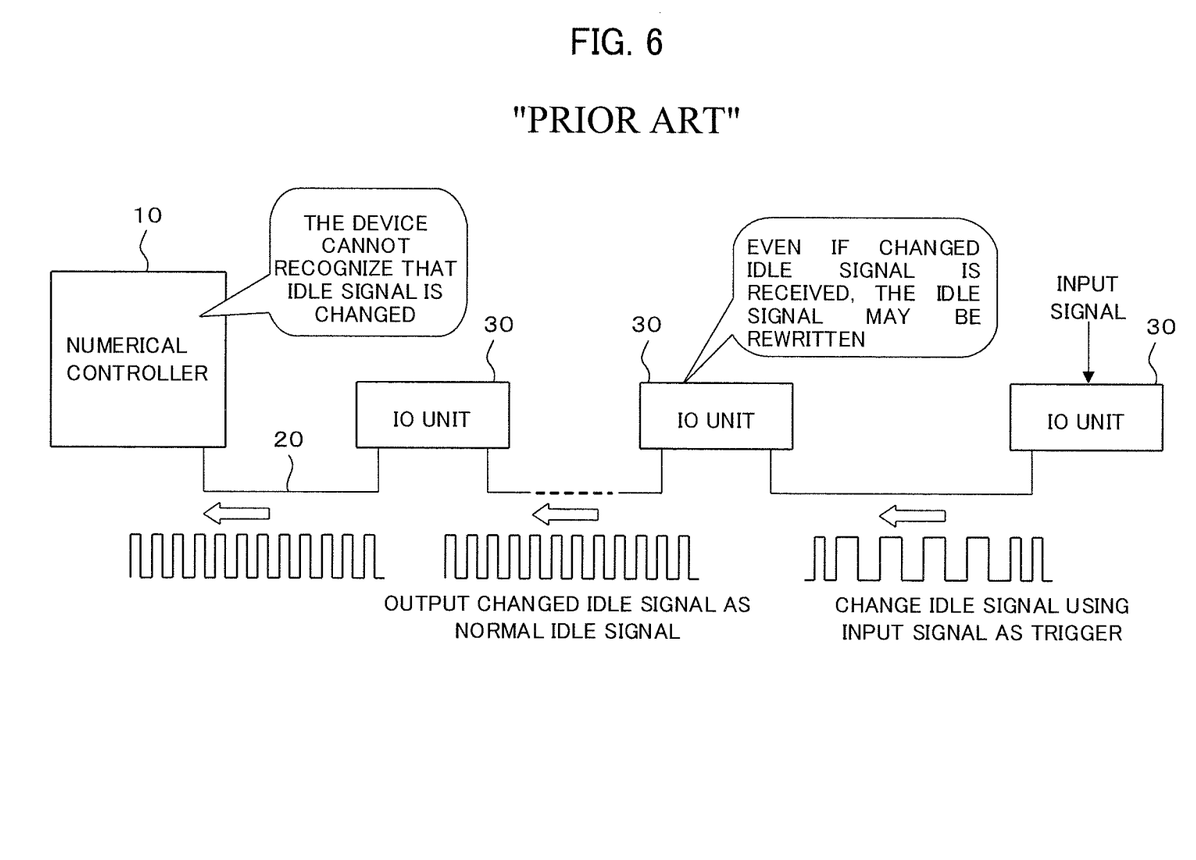
FIG. 6 is a diagram illustrating a numerical control system in which a plurality of IO units is daisy-chained to a conventional numerical controller.

FIG. 6 is a diagram illustrating a numerical control system in which a plurality of IO units is daisy-chained to a conventional numerical controller.

In the first embodiment, the IO unit 30 notifies the numerical controller 10 that the touch sensor output has been input by changing an idle signal after receiving an input signal. In a numerical control system configured by daisy-chaining the numerical controller 10 and a plurality of the IO units 30, however, if configured to perform periodic IO communication between the numerical controller and the IO unit, some IO unit receives an idle signal output from an IO unit connected to the latter side. Thus, even if the IO unit connected to the latter side receives an input signal and changes an idle signal to transmit the changed idle signal to an IO unit to the former side, the control unit of the IO unit on the former side may not be able to correctly transmit the changed idle signal to the numerical controller. The sixth embodiment solves this problem.

Figure 7:
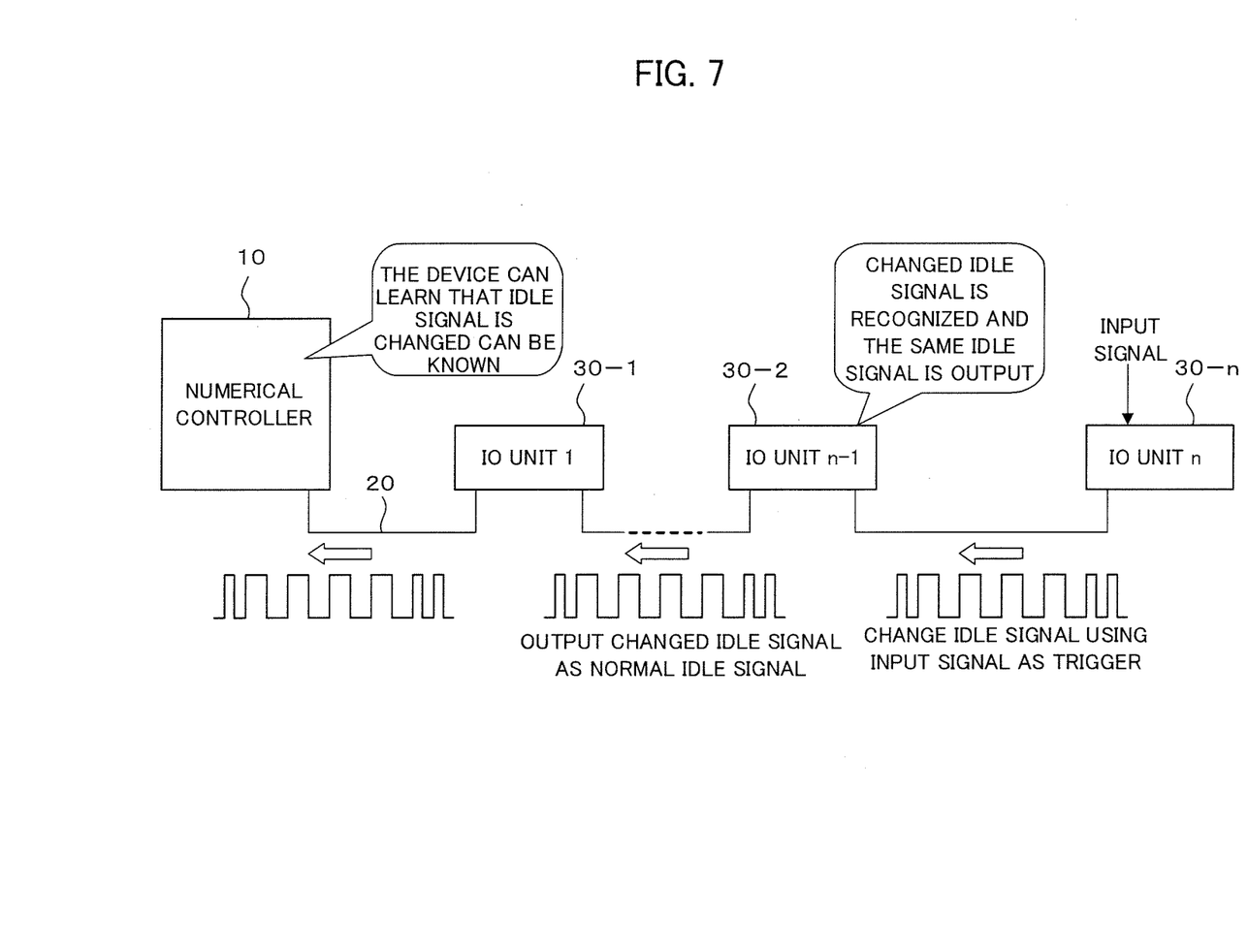
FIG. 7 is a diagram illustrating an embodiment that reliably transfers a changed idle signal to the numerical controller in the numerical control system in which the plurality of IO units is daisy-chained to the numerical controller.

FIG. 7 is a diagram illustrating an embodiment that reliably transfers a changed idle signal to the numerical controller in the numerical control system in which the plurality of IO units is daisy-chained to the numerical controller.

In the first embodiment, each of the IO units 30 changes and outputs an idle signal using an input signal as a trigger. Thus, in the sixth embodiment, the control unit included in each of the IO units 30 (the first control unit included in the IO unit 30 in the first to fourth embodiments and the third control unit included in the IO unit 30 in the fifth embodiment) is configured to transmit the same idle signal as the idle signal containing a specific signal pattern only when each of the IO units 30 detects in advance that the idle signal is changed to the specific signal pattern of a predetermined number of bits or more.

In the sixth embodiment, the changed idle signal can be transmitted up to the numerical controller 10 and even in a configuration in which the numerical controller 10 and the plurality of IO units 30 are daisy-chained, the numerical controller can be notified of an input signal while the delay time being minimized.

The invention claimed is:

1. A numerical control system having a numerical controller and one or a plurality of IO units connected to the numerical controller and in which input/output signals are configured to be exchanged between the numerical controller and the IO unit via serial communication, the IO unit comprising:

a first control unit configured to change an idle signal output from the IO unit using an input signal as a trigger to a preset specific waveform pattern signal and, transmit the specific waveform pattern signal to a former side when the specific waveform pattern signal is received and, the numerical controller comprising:

a second control unit configured to output an interrupt signal when the specific waveform pattern signal is received.

2. The numerical control system according to claim 1, wherein the first control unit of the IO unit is configured to change a period of the idle signal output from the IO unit and outputs the idle signal as the specific waveform pattern signal, when the input signal is input into the IO unit.

3. The numerical control system according to claim 2, wherein the first control unit of the IO unit detects the specific waveform pattern signal in the changed idle signal when the IO unit on a latter side receives the input signal, changes the idle signal output from the IO unit to the specific waveform pattern signal, and outputs the idle signal to the IO unit on the former side, and, output the detected idle signal unchanged to the former side only when predetermined conditions are met.

4. The numerical control system according to claim 1, wherein the first control unit of the IO unit is configured to insert a specific data pattern into the idle signal output from the IO unit and output the idle signal as the specific waveform pattern signal, when the input signal is input into the IO unit.

5. The numerical control system according to claim 4, wherein the first control unit of the IO unit detects the specific waveform pattern signal in the changed idle signal when the IO unit on a latter side receives the input signal, changes the idle signal output from the IO unit to the specific waveform pattern signal, and outputs the idle signal to the IO unit on the former side, and, output the detected idle signal unchanged to the former side only when predetermined conditions are met.

6. The numerical control system according to claim 1, wherein the first control unit of the IO unit is configured to change a phase of the idle signal output from the IO unit and output the idle signal as the specific waveform pattern signal, when the input signal is input into the IO unit.

7. The numerical control system according to claim 6, wherein the first control unit of the IO unit detects the specific waveform pattern signal in the changed idle signal when the IO unit on a latter side receives the input signal, changes the idle signal output from the IO unit to the specific waveform pattern signal, and outputs the idle signal to the IO unit on the former side, and, output the detected idle signal unchanged to the former side only when predetermined conditions are met.

8. The numerical control system according to claim 1, wherein the first control unit of the 10 unit detects the specific waveform pattern signal in the changed idle signal when the IO unit on a latter side receives the input signal, changes the idle signal output from the IO unit to the specific waveform pattern signal, and outputs the idle signal to the IO unit on the former side, and, output the detected idle signal unchanged to the former side only when predetermined conditions are met.

9. A numerical control system having a numerical controller and one or a plurality of IO units connected to the numerical controller and in which input/output signals are configured to be exchanged between the numerical controller and the IO unit via serial communication, the IO unit comprising:
- a receiving unit configured to determine a type of an input signal input into the IO unit; and,
- a third control unit configured to preset a specific waveform pattern of an idle signal output from the IO unit for each of the types of the input signal and output the preset specific waveform pattern of the idle signal output from the IO unit in accordance with the type of the input signal as a trigger; and, the numerical controller comprising:
- a fourth control unit configured to determine the type of the input signal in accordance with a specific waveform pattern signal when the specific waveform pattern is received.

10. The numerical control system according to claim 9, wherein the third control unit of the IO unit is configured to detect the specific waveform pattern signal in the changed idle signal when the IO unit on a latter side receives the input signal, changes the idle signal output from the IO unit to the specific waveform pattern signal, and output the idle signal to the IO unit on a former side, and, output the detected idle signal unchanged to the former side only when predetermined conditions are met.

\* \* \* \* \*